No. 828,713. PATENTED AUG. 14, 1906.
B. F. COFFMAN & L. B. CHERRY.
MOTOR VEHICLE.
APPLICATION FILED JAN. 13, 1906.
3 SHEETS—SHEET 1.
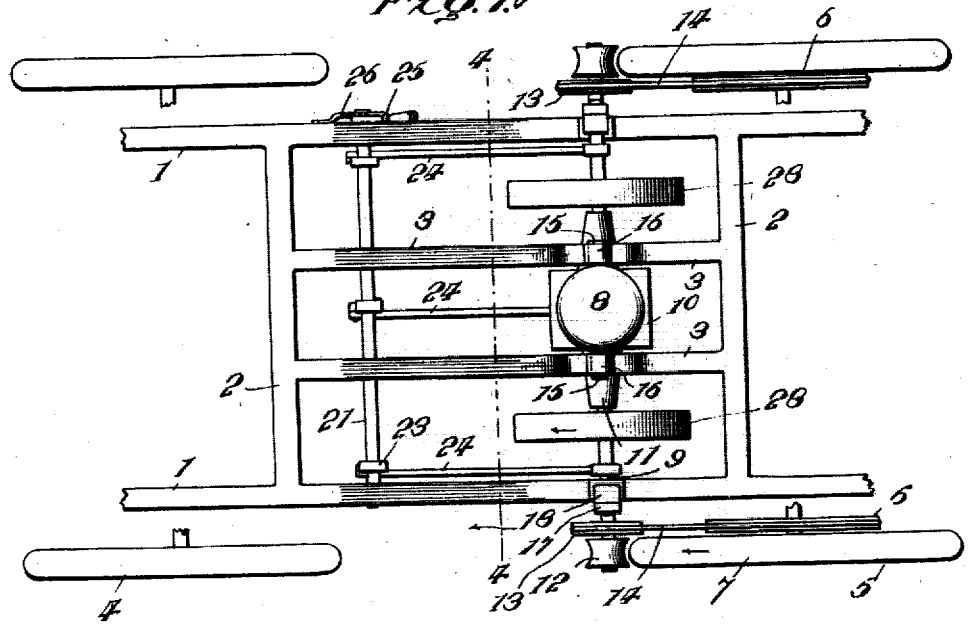
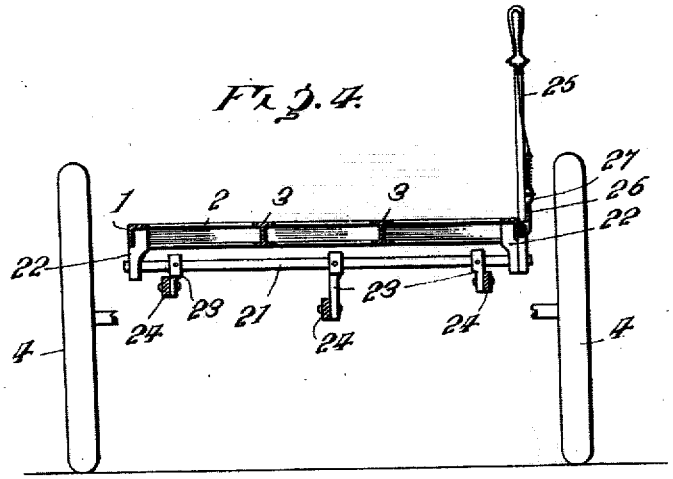

No. 828,713. PATENTED AUG. 14, 1906.
B. F. COFFMAN & L. B. CHERRY.
MOTOR VEHICLE.
APPLICATION FILED JAN. 13, 1906.
3 SHEETS—SHEET 2.
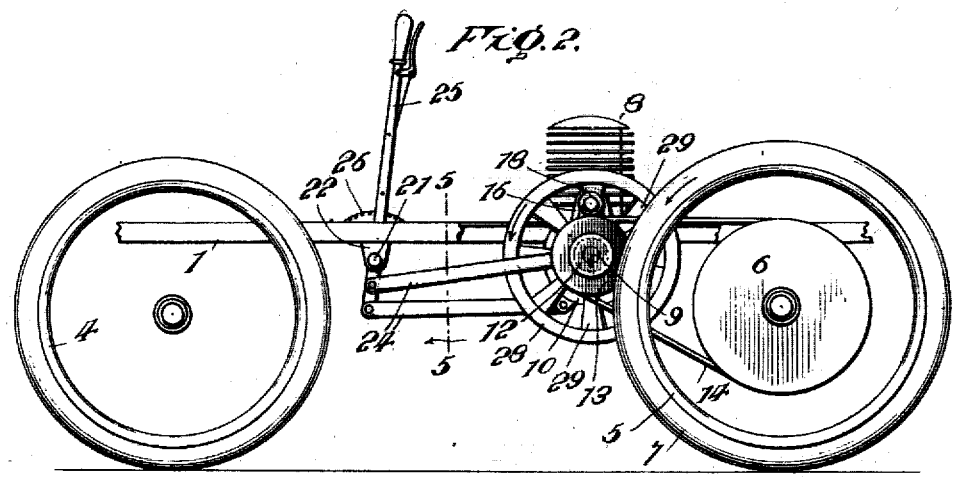
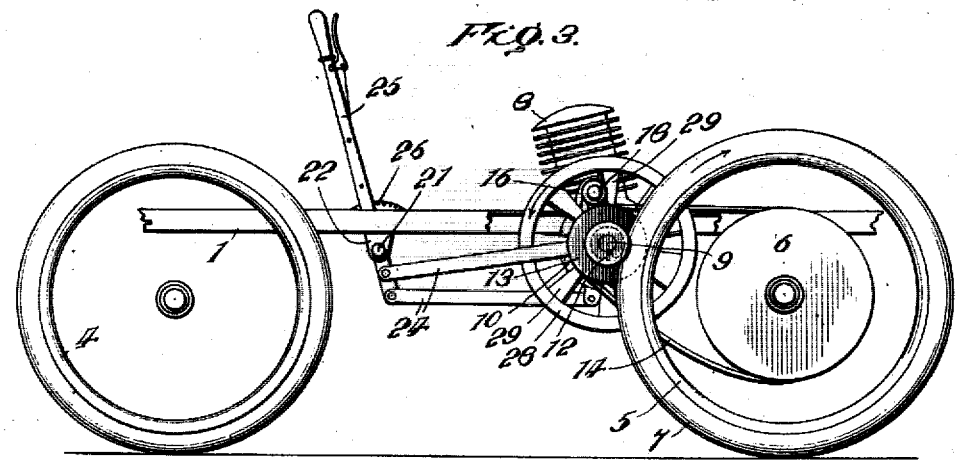
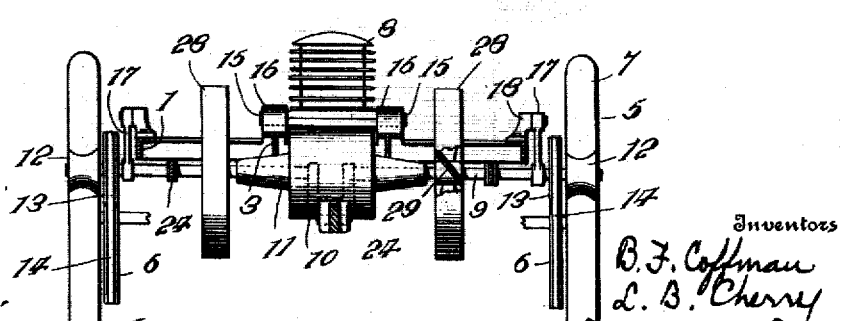

No. 828,713. PATENTED AUG. 14, 1906.
B. F. COFFMAN & L. B. CHERRY.
MOTOR VEHICLE.
APPLICATION FILED JAN. 13, 1906.
3 SHEETS—SHEET 3.
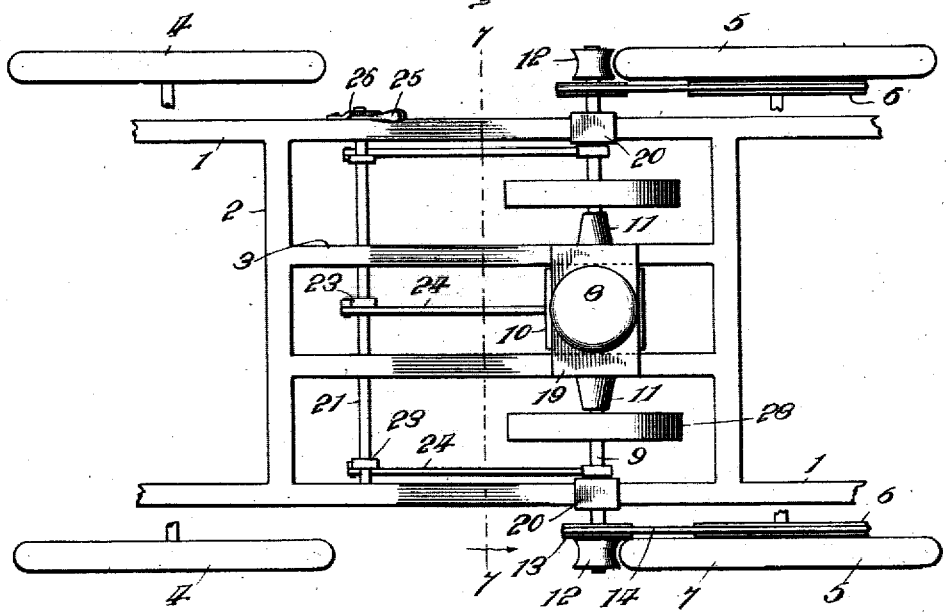
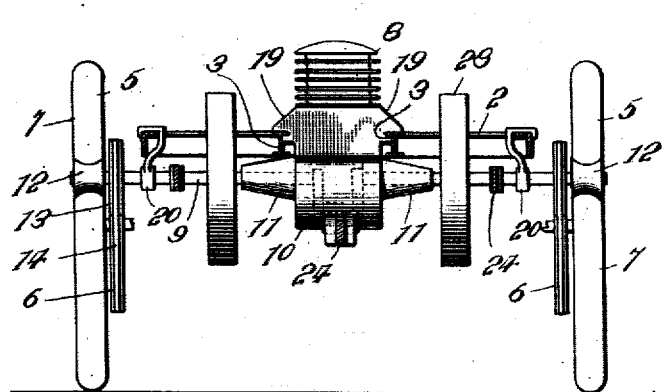

UNITED STATES PATENT OFFICE.

BENJAMIN F. COFFMAN AND LOUIS B. CHERRY, OF LINCOLN, ILLINOIS.

MOTOR-VEHICLE.

No. 828,713.　　　　　Specification of Letters Patent.　　　　　Patented Aug. 14, 1906.

Application filed January 13, 1906. Serial No. 295,931.

*To all whom it may concern:*

Be it known that we, BENJAMIN F. COFFMAN and LOUIS B. CHERRY, citizens of the United States, residing at Lincoln, Logan county, Illinois, have invented certain new and useful Improvements in Motor-Vehicles; and we do hereby declare the following to be a full, clear, and exact description of the invention, such as will enable others skilled in the art to which it appertains to make and use the same.

This invention relates to certain improvements in automobiles or motor-driven vehicles; and the objects and nature of the invention will be readily understood by those skilled in the art in the light of the following explanation of the structures shown in the accompanying drawings as examples for purposes of description from among other constructions and arrangements within the spirit and scope of our invention.

An object of the invention is to provide certain improvements in automobile construction and arrangement for the purpose of avoiding the employment of counter-shafts and transmission-gearing and of providing a simple and economical direct drive between the motor and axle or driving wheel or wheels.

A further object of the invention is to provide certain improvements in automobile construction whereby a direct drive is provided between the engine-motor shaft and wherein the engine-shaft is movable for reversing, driving, and disconnecting the driving connection with the driven axle or wheels of the vehicle.

A further object of the invention is the production of certain improvements in arrangements and combinations of parts, whereby an efficient, simple, and economical automobile construction will be produced.

The invention consists in certain novel features in construction and arrangement, or in combinations of parts and elements, as more fully set forth hereinafter.

Referring to the accompanying drawings, Figure 1 is a top plan view partially illustrating the running-gear and motor carried thereby. Fig. 2 is a side elevation showing the hand or controlling lever adjusted to hold the motor and its shaft in forward-drive position, with the driving-belts tightened. Fig. 3 is a side elevation showing the hand or controlling lever thrown forward and holding the motor or engine and its shaft in reverse-drive position with the friction-wheels in frictional engagement with the vehicle drive-wheels and with the driving-belts operatively disconnecting the engine-shaft and vehicle drive-wheels. Fig. 4 is a cross-section on the line 4 4, Fig. 1. Fig. 5 is a cross-sectional view on the line 5 5, Fig. 2. Fig. 6 is a top plan view of a running-gear and a motor carried thereby and slidable to its various positions for forward drive, non-drive, and reverse drive. Fig. 7 is a cross-sectional view on the line 7 7, Fig. 6.

In the drawings we show somewhat diagrammatically the running-gear or chassis of a motor-driven vehicle to show so much of the frame as may be necessary to support the motor and driving or transmission between the same and the vehicle-driving wheels. For instance, the running-gear frame shown comprises the longitudinal or side bars 1, cross-bars 2, and intermediate or motor-supporting longitudinal beams 3. These bars are rigidly secured together to form a strong rigid framework.

4 indicates the front wheels, which can be mounted and connected with the frame in any suitable manner and by any desirable means.

5 indicates the rear or drive wheels of the vehicle, which can be mounted on any suitable axle or otherwise connected with the frame in any desirable or well-known manner. At its inner side we show each drive-wheel 5 provided with a concentric usually grooved friction wheel or pulley 6, rigidly secured thereto. The drive-wheel 5 can be provided with any suitable tires 7, such as pneumatic, cushion, solid-rubber, or other tires.

8 indicates any suitable motor or engine, and 9 is the horizontal transverse engine or drive shaft. We usually employ a vertically-arranged explosive-engine—for instance, what is commonly known as a "gasolene-engine"—and the piston thereof (not shown) is connected in any suitable manner to rotate the engine-shaft, which in the specific example shown is arranged below the engine. We show by dotted lines the engine-shaft 9, provided with a crank for connection with the engine-piston. 10 is the engine-frame or crank box or casing, rigid with the engine-cylinder, and 11 represents the main bearings or journal-boxes for the engine-shaft, and these boxes are rigid with the crank-box and arranged at the opposite ends thereof. The engine is arranged between and is carried by the frame-beams 3, and the engine-shaft 9 extends through the crank-box 10 and boxes 11 and projects in opposite directions therefrom beneath the frame-bars and beyond the opposite side bars to points in advance of or opposite the two drive-wheels 5. The opposite ends of the engine-shaft are provided with small annular friction drive-surfaces, usually in the form of grooved pulleys 12, arranged in the vertical planes of the drive-wheels 5 and opposite and normally out of operative relation to annular or continuous friction drive-surfaces of said wheels, respectively. For instance, in the examples illustrated the friction drive-surfaces 12 of the engine-shaft are shown opposite and adapted to be moved to friction drive engagement with the tires 7 of the ground or drive wheels 7. The opposite end portions of the engine-shaft are also provided with usually grooved belt or band pulleys or pinions 13, respectively, opposite the band or belt pulleys 6, rigid with the drive-wheels and having driving connection therewith through the medium of the endless flexible friction drive belts or bands 14.

The engine-shaft is so carried and mounted as to be movable to various positions at varying distances from the drive-wheels 5 for the purpose of actuating the drive-wheels to move the vehicle forward or to throw out or break the driving connection or relation between the engine-shaft and said drive-wheels or to reverse the driving relation between said shaft and wheels for the purpose of backing the vehicle. For instance, when the engine-shaft is in forward-drive position it is at its advanced position, thereby tightening the belts 14 to operative driving relation with the friction reverse-drive surfaces 12 advanced from and out of operative driving relation with the corresponding friction-surfaces, such as 7, of the drive-wheels. When the engine is operating and the engine-shaft is in said forward-drive position, the vehicle will be propelled forward through the medium of the friction-belts 14. To disconnect the driving connection or relation between the engine and drive-wheels, permitting the engine to continue its operation without propelling the vehicle, the engine-shaft is moved to its intermediate or non-drive position, wherein the belts are loosened or hang so slack as not to have driving relation with the drive-wheels 5 and wherein the reverse-drive friction-surfaces 12 and 7 are out of driving contact or relation. To back the vehicle, the engine-shaft is moved to its rearward or reverse-drive position, wherein the slackness of the belts 14 prevents their driving relation with the wheels 5 and wherein the friction reverse-drive surfaces 12 are maintained in direct friction drive-contact with and relation to the surfaces 7 of the drive-wheels.

In the construction illustrated by Figs. 1, 2, and related figures the engine is mounted to oscillate or swing on a transverse axis to carry the engine-shaft to the desired position. In the construction illustrated by the remaining figures the engine is bodily movable horizontally fore and aft of the vehicle and is carried by sliding supports to move the engine-shaft to the desired position. In the first-named construction the engine-cylinder at the proper distance above the crank-box is provided with the horizontal diametrically opposite trunnions 15, supporting the cylinder and mounted to oscillate in the elevated journal-boxes 16, secured on the frame-beams 3. The engine swings on these trunions, as hereinbefore described. Additional supports for the engine-shaft end portions can be provided. For instance, 17 represents depending swinging hangers, in the lower ends of which the engine-shaft turns. These hangers at their upper ends are hung to swing from the upwardly-extending brackets 18, secured on the frame side bars 1 and so arranged that the axis on which each hanger 17 swings will be in the axial line of trunnions 15 on which the engine swings.

In the construction shown by Fig. 6 the engine-cylinder is provided with rigid laterally-projecting supporting-brackets 19, resting on and slidable longitudinally of the beams 3 and lapping under said beams to hold the engine to the same. The end portions of the engine-shaft rotate in hangers 20, depending from and supported and slidable on the frame side bars 1, usually about as shown, the two constructions shown being practically the same except for the differences between the pivotal and slidable mountings for the engine and shaft. As a means which can be conveniently employed for shifting the engine-shaft to its various positions we show a transverse rock-shaft 21, arranged in advance of the engine-shaft and mounted to rock in hangers 22, depending from the frame-bars. This rock-shaft is provided with depending rocker-arms 23, rigid therewith, and these arms are pivotally connected by the rearwardly-extending push and pull links 24 with the lower portions of the engine-crank box and with the lower portions of the hangers 17 of Fig. 1 or the hangers 20 of Fig. 6. It will hence be observed that the engine and engine-shaft will be moved forwardly or rearwardly by the oscillation of said rock-shaft through the medium of said arms and links. 25 is an upwardly-projecting manually-operated lever, such as a hand or foot lever, rigid with the rock-shaft 21 and provided with manually-controlled locking and releasing means, such as a fixed toothed sector 26 and a hand-clip and pawl 27, for locking the lever 25, and hence the engine-shaft, in the desired adjustment. It is obvious that according to the particular arrangement shown rearward movement of the lever 25 will adjust the engine-shaft to forward-drive position, while partial forward throw of said lever will adjust said shaft to non-drive position, while complete forward throw of said lever will adjust said shaft to reverse-drive position. The engine-shaft is shown provided with two similar balance or fly wheels 28, arranged on opposite sides of and adjacent to the engine-cylinder, and these wheels are provided with radial fan-blades 29. The series of fan-blades of each wheel are so inclined as to create a draft or blast of air and direct the same against the engine-cylinder. The two fly-wheels hence throw the air-blasts in opposite directions and against opposite sides of the cylinder for the purpose of cooling the same or assisting in the operation of cooling the cylinder.

We wish to cover our invention as applied to various types of motor-driven vehicles or cars employing single, multiple, horizontal, vertical, or combination types of explosive-engine and also where separate motor and engine shafts are employed for the vehicle drive-wheels.

Having thus described our invention, what we claim, and desire to secure by Letters Patent, is—

1. In a motor-vehicle, in combination, a frame, a traction-wheel, a shiftable engine movably supported on the frame and comprising a crank-box fixed thereto, a transverse engine-shaft mounted in and carried by said crank-box, a flexible endless belt between said shaft and said wheel and tightened and loosened by shifting said engine, and manually-controlled engine shifting and locking means comprising a rock-shaft having a push and pull link connection to said crank-box, and an operating-lever, substantially as described.

2. In a motor-vehicle, in combination, a frame, having intermediate engine-supporting beams, a shiftable engine arranged between and movably supported on said beams, a transverse engine-shaft carried by and shiftable with said engine, manually-controlled engine shifting and locking means, a vehicle traction-wheel, an endless friction driving-belt between said shaft and said wheel and controlled by the position of said engine, substantially as described.

3. In a motor-vehicle, in combination, a vehicle traction-wheel, a frame provided with alined bearings, a swingable engine having trunnions mounted in said bearings, and having a crank-box fixed thereto and moving therewith, manually-controlled engine-swinging means, a transverse engine-shaft mounted in and carried by said box, and direct friction driving means between said shaft and said traction-wheel and controlled by the position of said engine, substantially as described.

4. In a motor-vehicle, in combination, a traction-wheel, a frame, a shiftable engine pivotally supported on the frame on an axis transverse the frame, said engine being approximately balanced on said axis, and provided with and carrying its engine-shaft arranged transversely of the vehicle, manually-controlled means to swing said engine, and an endless friction-belt between said shaft and traction-wheel and controlled by the position of said engine, substantially as described.

5. In a motor-vehicle, in combination, a frame, traction-wheels, a shiftable engine pivotally supported on the frame about centrally between said wheels, and at its lower end provided with and carrying a transverse engine-shaft having reverse-drive friction-surfaces opposite said wheels, endless forward-drive friction-belts between said shaft and said wheels, and means for swinging said engine and locking the same in the desired position.

6. In a motor-vehicle, in combination, a frame, traction-wheels, a shiftable engine movably supported by said frame and comprising an engine-frame, an engine-shaft mounted in and movable with said engine-frame and arranged transversely of the vehicle-frame and provided with annular friction-surfaces adjacent said wheels and adapted by shifting the engine, to be brought into operative engagement with said wheels, direct endless friction drive-belts between said shaft and said wheels and tightened and loosened by shifting said engine, and manually-controlled engine shifting and locking mechanism for throwing said belts into and out of operative connection and for throwing said friction-surfaces into and out of operative position.

7. In a motor-vehicle, in combination, a frame, traction-wheels, a shiftable engine movably supported on the frame about centrally between said wheels, and provided with and carrying a transverse engine-shaft having reverse-drive friction-surfaces opposite said wheels, direct endless forward-drive friction-belts between said shaft and said wheels, and means for moving said engine and locking the same in the desired position, for the purposes substantially as described.

8. In a motor-vehicle, in combination, a frame, a traction-wheel, a shiftable engine having opposite lateral projections movably supporting the engine in the frame, the transverse engine-shaft carried by and shiftable with the engine, direct forward and reverse drive friction transmission means between said shaft and said wheel, and means for shifting the engine and locking the same in the desired position, for controlling said means.

9. In a motor-vehicle, in combination, a frame, traction-wheels, a shiftable engine movably supported in the frame about midway between said wheels, the engine-shaft carried by and shifting with the engine and projecting in opposite directions from the engine and approximately into the planes of said wheels, supports for the end portions of said shaft movably carried by the frame, direct forward and reverse friction transmission driving means between said shaft and said wheels and thrown into and out of operative connection by shifting said engine, and manually-controlled means for shifting said engine and locking the same in the desired position, comprising push and pull links to said engine and to the end portions of said shaft.

10. In a motor-vehicle, in combination, a frame having engine-supporting beams, a shiftable engine arranged between and movably supported by said beams, a transverse engine-shaft driven and carried by said engine and shiftable therewith, a vehicle traction-wheel, a direct endless friction drive-belt between said shaft and said wheel, said shaft provided with an annular friction-surface opposite said wheel and adapted to be brought into operative engagement therewith when said engine is shifted to throw said belt out of operative position by slackening the same, and manually-controlled means for shifting said engine.

11. In combination, a frame, comprising engine-supporting beams, a vehicle traction-wheel, a shiftable engine movably supported by said beams and comprising a crank-box rigid with said engine, an engine-shaft mounted in said crank-box and shifting with the engine and provided with a surface opposite said wheel, an endless friction drive-belt between said shaft and wheel, and means to shift the engine to move said shaft toward and from said wheel and thereby slacken the belt and bring said surface into engagement with the wheel or tighten the belt and move said surface from the wheel.

12. In combination, in a motor-vehicle, a frame, vehicle traction-wheels, a shiftable engine movably supported in the frame and arranged about midway between said wheels, the engine-shaft carried by said engine and shiftable therewith toward and from said wheels and provided with surfaces arranged opposite the wheels and adapted by shifting the engine to be brought into operative engagement with said wheels, endless friction drive-belts between said shaft and said wheels and adapted to be slackened when said engine is shifted to bring said surfaces into engagement with said wheels, and means for shifting said engine and for locking the same in forward-drive position, non-drive position, and reverse-drive position.

13. In combination, in a motor-vehicle, a frame, vehicle traction-wheels, a shiftable engine movably supported by the frame and provided with and driving an engine-shaft having annular friction-surfaces opposite the wheels, and being shiftable with the engine, endless friction drive-belts between said shaft and said wheels, and manually-controlled means for shifting the engine to tighten or slacken said belts and to move said surfaces from or into direct operative engagement with said wheels, and for locking the engine in forward-drive position, non-drive position and reverse-drive position.

14. In a motor-vehicle, in combination, a frame, traction-wheels, a shiftable engine movably supported on the frame and comprising an engine-frame, the engine-shaft mounted in and carried by said frame and shifting with the engine toward and from said wheels, endless flexible driving-belts between and directly connecting said shaft and said wheels, and manually-controlled engine shifting and locking means for shifting said engine to tighten and loosen said belts, substantially as described.

15. In a motor-vehicle, in combination, a frame, traction-wheels, a movable engine having means for movably supporting the same in the frame and provided with and carrying a crank-box, an engine-shaft arranged transversely of the vehicle and mounted in and carried by said crank-box, direct friction driving transmission means between said shaft and said wheels controlled by the position of said engine, friction reverse-drive means carried by said shaft for direct frictional driving engagement with said wheels, and a manually-operated lever and locking mechanism comprising a push and pull link connection to said crank-box for shifting the position of said engine to forward-drive position, non-drive position, or reverse-drive position.

16. A motor-vehicle provided with a movably-mounted engine having its engine-shaft directly coupled thereto and driven thereby and shiftable therewith, means to shift said engine to and from and lock the same in forward-drive position, non-drive position and reverse-drive position, direct forward-drive friction transmission means between said shaft and the vehicle traction-wheels, and direct frictional reverse-drive means on said shaft to engage said wheels.

In testimony whereof we affix our signatures in presence of two witnesses.

BENJAMIN F. COFFMAN.
LOUIS B. CHERRY.

Witnesses:
JOHN S. HALLER,
ROBERT O. HALLER.